United States Patent [19]

Drewery et al.

[11] Patent Number: 5,956,091
[45] Date of Patent: *Sep. 21, 1999

[54] METHOD OF SHOWING 16:9 PICTURES ON 4:3 DISPLAYS

[75] Inventors: John Oliver Drewery, Sutton; Victor Gerald Devereux, Cheam, both of United Kingdom

[73] Assignee: British Broadcasting Corporation, London, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/820,700

[22] Filed: Mar. 18, 1997

Related U.S. Application Data

[63] Continuation of application No. 08/379,510, filed as application No. PCT/GB93/01611, Jul. 29, 1993, abandoned.

[30] Foreign Application Priority Data

Aug. 7, 1992 [GB] United Kingdom .................. 9216844

[51] Int. Cl.$^6$ ...................................................... H04N 7/01
[52] U.S. Cl. ............................................ 348/445; 348/580
[58] Field of Search .................................... 348/445, 441, 348/580, 704, 806, 36, 556; 315/370; 345/213

[56] References Cited

U.S. PATENT DOCUMENTS

| | | | |
|---|---|---|---|
| 3,757,040 | 9/1973 | Bennett et al. ........................... | 348/36 |
| 4,556,906 | 12/1985 | Dischert et al. ......................... | 358/180 |
| 4,605,452 | 8/1986 | Powers .................................... | 348/445 |
| 4,605,952 | 8/1986 | Powers .................................... | 358/13 |
| 4,751,660 | 6/1988 | Hedley .................................... | 345/213 |
| 4,752,828 | 6/1988 | Chapuis ................................... | 348/580 |
| 4,754,204 | 6/1988 | Ando ....................................... | 348/448 |
| 4,763,194 | 8/1988 | Osman .................................... | 348/704 |
| 4,951,125 | 8/1990 | Kojima et al. ........................... | 348/580 |
| 5,287,042 | 2/1994 | Haferl ..................................... | 315/370 |
| 5,301,025 | 4/1994 | Hatano et al. ........................... | 348/806 |
| 5,461,431 | 10/1995 | Takebuchi et al. ...................... | 348/556 |
| 5,537,149 | 7/1996 | Teraoka et al. .......................... | 348/556 |

FOREIGN PATENT DOCUMENTS

| | | |
|---|---|---|
| 0 416 619 A3 | 3/1991 | European Pat. Off. . |
| 0 496 333 A2 | 7/1992 | European Pat. Off. . |
| 2 073 536 | 10/1981 | United Kingdom . |
| 2 191 060 | 12/1987 | United Kingdom . |

*Primary Examiner*—Victor R. Kostak
*Attorney, Agent, or Firm*—Dike, Bronstein, Roberts & Cushman, LLP; George W. Neuner

[57] ABSTRACT

In a method of processing 16:9 pictures for display on a screen with a 4:3 aspect ratio, each line of the television signal is compressed and/or expanded so that the ratio of the length of a segment of unprocessed signal to the length of the resultant signal derived from it, varies along the line. Preferably, each line is subject to "cylindrical" processing such that it is compressed as though the line were extended along an arc of a circle and projected along a direction onto a flat plane joining the ends of the arc. The picture may also be subject to slight vertical stretching to give a final image which is subject to distortion at an acceptable level while retaining a good level of vertical detail.

13 Claims, 7 Drawing Sheets

METHOD OF SHOWING 16:9 PICTURES ON 4:3 DISPLAYS

This application is a continuation of application Ser. No. 08/379,510 filed on Apr. 11, 1995, now abandoned.

FIELD OF THE INVENTION

The present invention relates to a method of processing a television signal representing a plurality of lines which when displayed dequentially form an image.

BACKGROUND OF THE INVENTION

At the present time, there is considerable interest in the adoption of an aspect ratio of 16:9 for television pictures, instead of the existing ratio of 4:3. One particular problem in adopting this new aspect ratio is that it will probably be necessary initially to transmit the 16:9 pictures in a manner compatible with receivers having a 4:3 display so that the same signal gives acceptable pictures on receivers both with 4:3 displays and with 16:9 displays.

One method of overcoming this problem involves presenting the pictures on a 4:3 display in a "full letterbox" format as illustrated in FIG. 1. With this format, the number of active scanning lines containing picture information is 432 lines rather than the normal. 576 lines for a 625-line scanning standard. The main objection to this full letterbox format is the presence of broad black borders at the top and the bottom of the 4:3 display. There is the further disadvantage that vertical detail is lost when the number of active picture lines is reduced.

Another method is to allow the 16:9 picture to fill the whole of the 4:3 display, with no black borders, in which case the picture detail will be stretched vertically by 25%, i.e., people would become tall and thin. This method has the advantage that no vertical detail is lost and it would therefore be sensible to use it in studios where the scan height of 4:3 displays could be adjusted if desired to give the correct geometry. For broadcasting to existing domestic receivers, a 25% vertical stretch would be too noticeable to be acceptable; however, the use of a small amount of vertical stretch could provide a useful compromise between the disadvantages of the full letterbox and full-height formats.

A further method is so-called edge compression in which a central region of each line is uncompressed or is compressed uniformly which a marginal portion o each at the left and right edges of the image display is compressed to change the aspect ratio of the image overall. Two such edge compression methods are described in United Kingdom Patent application 2,191,060 and U.S. Pat. No. 4,605,952.

SUMMARY OF THE INVENTION

The method of the invention is characterised in that each line signal is compressed and/or expanded so that the ratio of the length of a segment of the unprocessed signal to the length of the segment of the resultant signal derived from it varies continuously along each line.

In a pre erred embodiment, the signal representing each line is compressed more adjacent the ends of each line than it is in the middle of the line, each line signal being compressed as though the line were disposed along an arc of a circle and projected onto the chord joining the ends of that arc along a direction perpendicular to that notional chord, the overall compression ratio of the line being given by sin $(\alpha)/\alpha$ where $2\alpha$ is the angle in radians subtended by the notional chord at the centre of a notional circle of which said arc is a part.

This technique may permit an increase in the active picture height but with less obvious geometric distortion than results from a simple vertical stretch in its preferred form, the technique involves squeezing the sides of the 16:9 picture while leaving the centre of the picture undisturbed using a process which will be referred to as "cylindrical" processing. This squeezing produces a picture with all the original details but with an aspect ratio lower than 16:9, e.c. 14:9 as shown in FIG. 2. As a result, the active height of the picture is greater than that of a 432-line full letterbox display assuming that the picture occupies the full width of the 4:3 display in both cases.

Although cylindrical processing could be used to squeeze a 16:9 picture into a 4:3 aspect ratio, thus entirely eliminating the black borders on a 4:3 display, the resulting geometric distortion has been found to be unacceptable. Hence, if cylindrical processing is to be employed, a compromise is required which results in a residual amount of border.

Following a number of initial tests, it was decided that subjective tests should be carried out to assess the acceptability of 16:9 pictures on a 4:3 display using (a) a 16:9 full letterbox format and (b) a 14:9 format achieved using a combination of cylindrical processing and simple vertical stretch; this combination will be referred to as "stretched cylinder" processing. The resulting form of picture distortion is illustrated in FIG. 3; further details for this figure are given below. These tests are described below, preceded by a description of the principles of cylindrical processing.

Receivers with 16:9 displays would require circuitry to undo cylindrical processing and to restore the picture to full height; the latter would also apply to the full letterbox format. In connection with this processing, it should be noted that the squares drawn in the middle of the picture area in FIG. 2 are bigger than those in FIG. 1. As a result, the cylindrical format has the advantage that it gives more horizontal resolution at the centre of a regenerated 16:9 display, but less at the edges, compared to that given by a full letterbox format. Also, the vertical resolution is better for the cylindrical format because more active lines are used. (It has been assumed that no use has been made of the black borders to transmit additional information about high-frequency detail in the original 16:9 picture).

BRIEF DESCRIPTION OF THE DRAWINGS

A method in accordance with the invention will now be described in detail, by way of example, with reference to the drawings, in which.

DETAILED DESCRIPTION OF THE PREFERRED EMBODIMENTS

Principles of Cylindrical Processing

Figure 4:
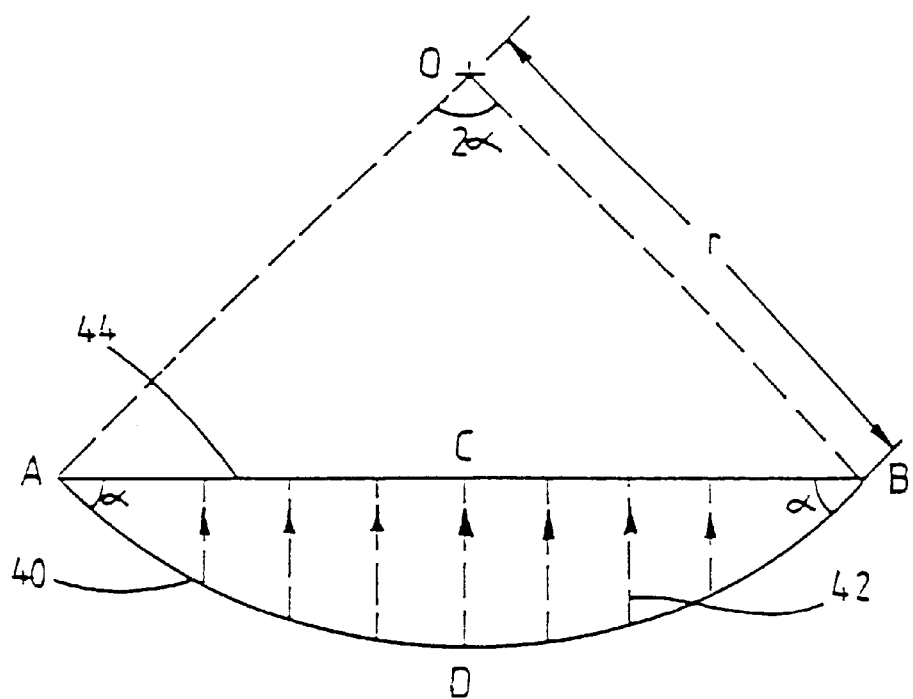
FIG. 4 shows diagrammatically the cylindrical projection of a 16:9 picture onto a flat plane.

The type of geometrical distortion introduced by cylindrical processing is equivalent to that obtained if the undisturbed 16:9 picture is wrapped round part of a vertical cylinder and the resulting curved picture is then projected on to a flat vertical surface passing through the sides of the picture. This process is illustrated in FIG. 4 which represents a horizontal cross-section of a display. As shown, the 16:9 picture plane 40 is wrapped around a sector ADS of a cylinder. The picture is projected along lines 42 onto a flat plane 44, the chord joining the ends of the arc ADS. It is to be noted that the length L of the line ACB is $2r \cdot \sin(\alpha)$ whereas that of the arc ADB(A) is $2r \cdot \alpha$. It can be seen that maximum squeezing effect occurs near the edges A and B of the picture while there is no change in width of objects near the centre of the picture.

If L=width of compressed picture, i.e. length of the straight line ACB.

A=width of uncompressed picture, i.e. length of the arc ADB.

$2\alpha$=angle in radians subtended by AB at the centre 0 of the cylinder.

then, by simple geometry:

Overall compression ratio, $L/A = \sin(\alpha)/\alpha$

The maximum compression ratio of individual objects within the picture, occurring at the sides of the picture, is equal to $\cos(\alpha)$.

If the size of the cylindrically processed picture is adjusted so that it occupies the full width of a 4:3 display, the resulting height can be calculated as follows:

Assume we start with a 16:9 full letterbox picture of height 432 lines occupying the full width of a 4:3 display. We then cylindrically process this picture, thereby reducing its width by a factor of L/A. The vertical and horizontal dimensions of this cylindrically processed picture must now be increased by a factor of A/L if the picture is to be restored, without further distortion, to occupying the full width of the display. Thus:

Height of cylindrical picture=432*A/L active picture lines

The resulting compression ratios and active picture heights for different angles of wrap round the cylinder are given in Table 1.

TABLE 1

Compression and picture height for given wrap angle.

| Wrap Angle, $2\alpha$ | Ratio, L/A | Max. Compn.$\cos(\alpha)$ | Picture Height |
|---|---|---|---|
| 0 degrees | 1.00 | 1.00 | 432 lines |
| 70 " | 0.94 | 0.82 | 460 " |
| 80 " | 0.92 | 0.77 | 469 " |
| 90 " | 0.90 | 0.71 | 480 " |
| 100 " | 0.88 | 0.64 | 492 " |
| 110 " | 0.85 | 0.57 | 506 " |
| 120 " | 0.83 | 0.50 | 522 " |

Initial tests indicated that a compression ratio L/A of about 90% was about the lowest ratio that could be used without the geometric picture distortion becoming too obvious on critical scenes From Table 1, this L/A ratio gives a picture height of 480 lines with black borders each of height 48 lines.

Height Adjustment

The amount of black border given by a compression ratio of 90% is still somewhat obtrusive and it was therefore decided that it might be reduced still further by means of a slight amount of vertical stretch. Initial tests indicated that it would be worth examining the acceptability of stretched cylindrical processing involving a 5% increase in height in addition to an increase in picture height given by cylindrical processing.

Subjective Tests

Various picture sequences originally recorded as full-screen 16:9 pictures were re-recorded for display on a 4:3 screen in (a) full letterbox format and (b) stretched cylinder format.

Brief details of the six picture sequences were as follows:
1. Military Band—Changing of the guards.
2. FA Cup Final—1989 Liverpool v Everton.
3. Ballet—Prince of the Pagodas.
4. Top of the Pops—Tina Turner.
5. Wildlife programme—Wind in the Willows.
6. Shakespeare—Items from Henry V.

Six different picture sequences originally recorded as HDTV (High Defination Television) 1250-line 16:9 aspect-ratio pictures were replayed through a 1250 to 625-line down converter and recorded as 625 line pictures filling the full width of the display but with reduced height. Height reduction was performed in the down converter which employed a high-quality vertical interpolator retaining the maximum possible vertical definition.

The sequences were recorded twice, first with an active picture height of 432 lines to give 16:9 full letterbox pictures and secondly with an active picture height of 500 lines to give 14:9 pictures on a 4:3 display. (More precisely, 500 lines corresponds to an aspect ratio of 13.8:9 which is the geometric mean of 16:9 and 12:9.)

Figure 1:
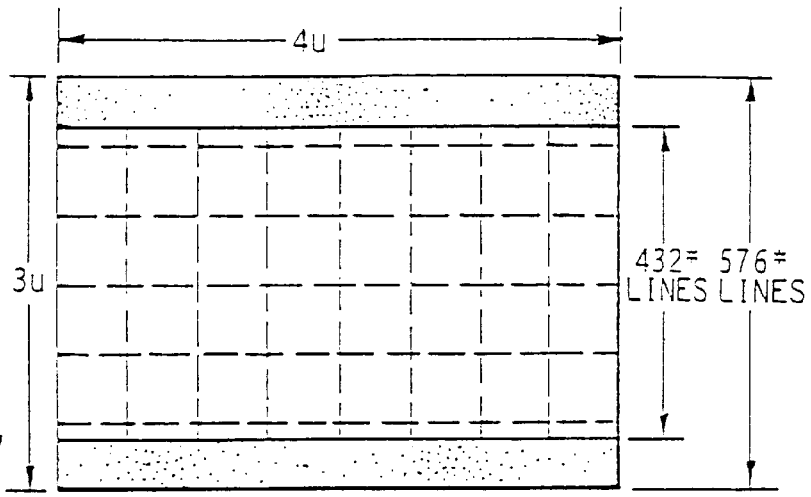
FIG. 1 shows a 16:9 "full letterbox" presentation of a 16:9 picture on a 4:3 display.
Figure 2:
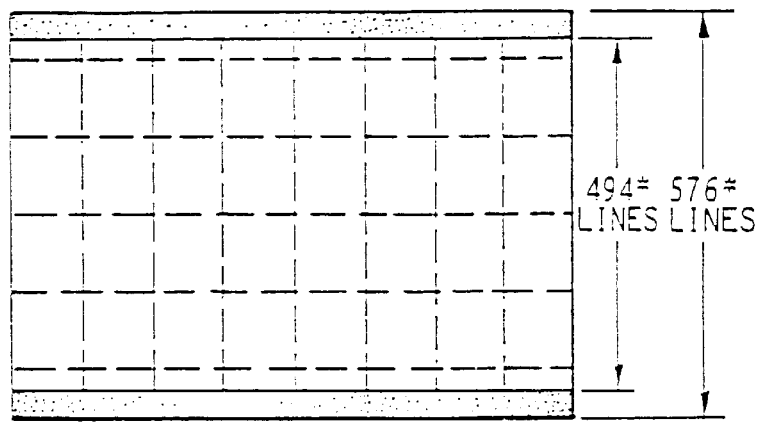
FIG. 2 shows a 14:9 "cylindrical" presentation of a 16:9 picture on a 4:3 display (drawn to scale)
Figure 3:
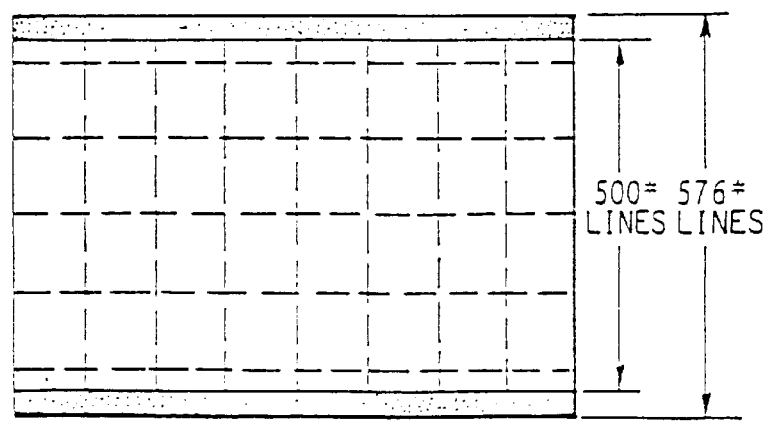
FIG. 3 shows a 14:9 "stretched cylindrical" presentation of a 16:9 picture on a 4:3 display (drawn to scale)

The 500-line recording was processed using Questec "Cleo" DVE (Digital Video Editing) equipment and the resulting signals were re-recorded on a second VTR. This processing involved two operations. Firstly, cylindrical processing was applied, using a cylindrical angle of 86 degrees, giving a compression ratio L/A=0.909. Secondly, the overall picture width was adjusted in a linear manner to just fill the available active line-period; the active picture height was left unaltered at 500 lines. The resulting geometric distortion is illustrated in FIG. 3 where the original 16:9 picture consisted of a grid as shown in FIG. 1.

Since, according to Table 1, the active picture height for cylidrical processing with L/A=0.909 would be 475 lines, the fact that the acitive picture was actually 5CO lines means that an additional liner vertical stretch factor of 500/475=1.05 was also applied.

Finally, the undistorted 432-line full letterbox and the stretched cylinder 500-line recordings were edited together to produce a tape with the following format.

| Duration | | Picture content |
|---|---|---|
| mins | secs | |
| | 5 | Caption:- Version A |
| 2 | | Picture sequence 1, Version A |
| | 5 | Caption:- Version B |
| 2 | | Picture sequence 1, Version B |
| | 15 | Caption:- Vote Now |
| | 5 | Caption:- Version A |
| 2 | | Picture sequence 2, Version A |
| | 5 | Caption:- Version B |
| 2 | | Picture sequence 2, Version B |
| | 15 | Caption:- Vote Now |
| | | and so on for next four picture sequences. |

This broadcast-quality edited tape was then transferred to VHS format. Two versions of the VHS tape were made, one with the full letterbox format shown before the stretched cylinder format (Version A=16:9, Version B=14:9) and the other with the reverse order of presentation.

Figure 5:
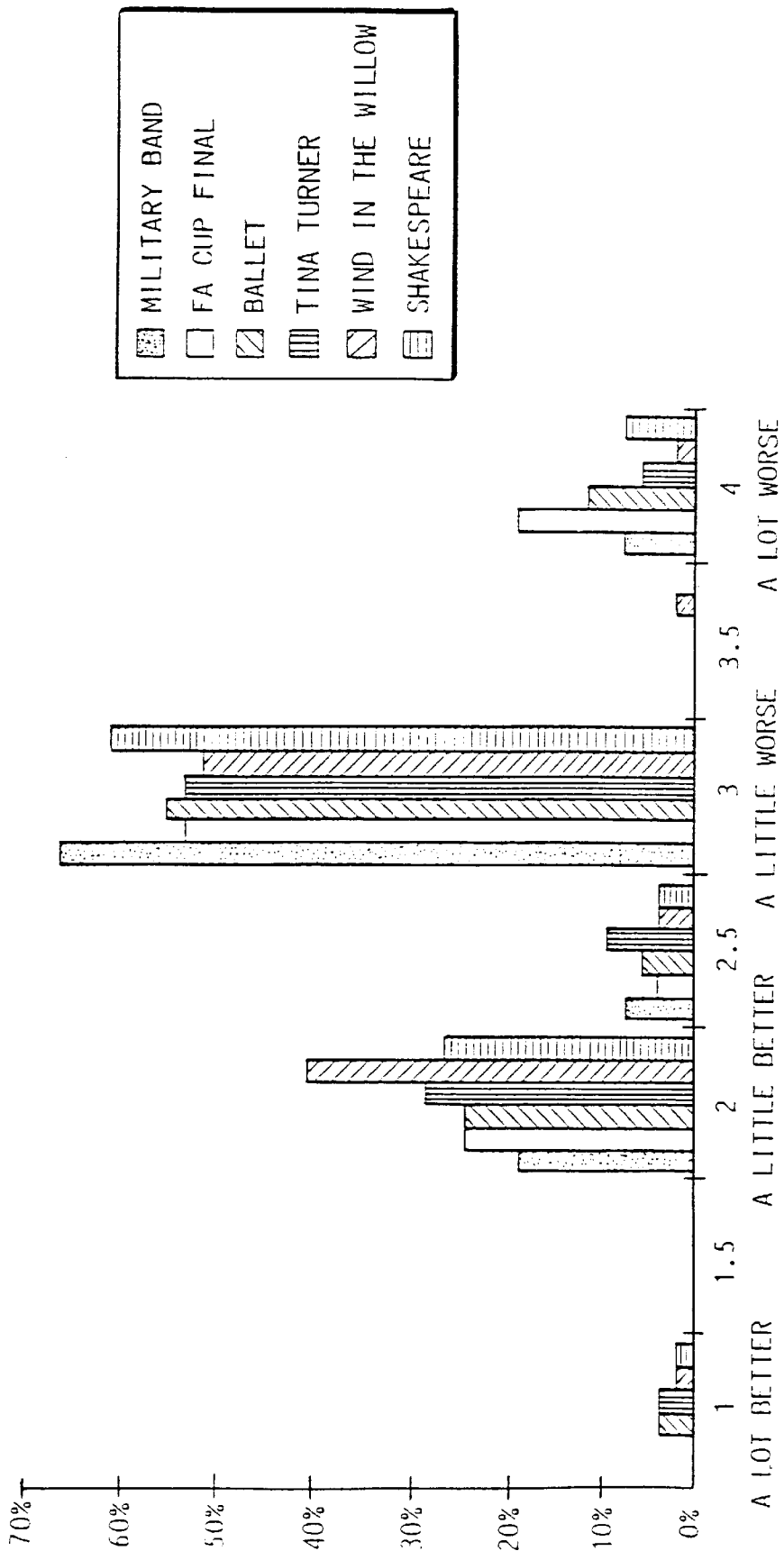
FIG. 5 is a histogram illustrating the results of subjective tests carried out using 14:9 cylindrical presentation of a 16:9 picture.
Figure 6:
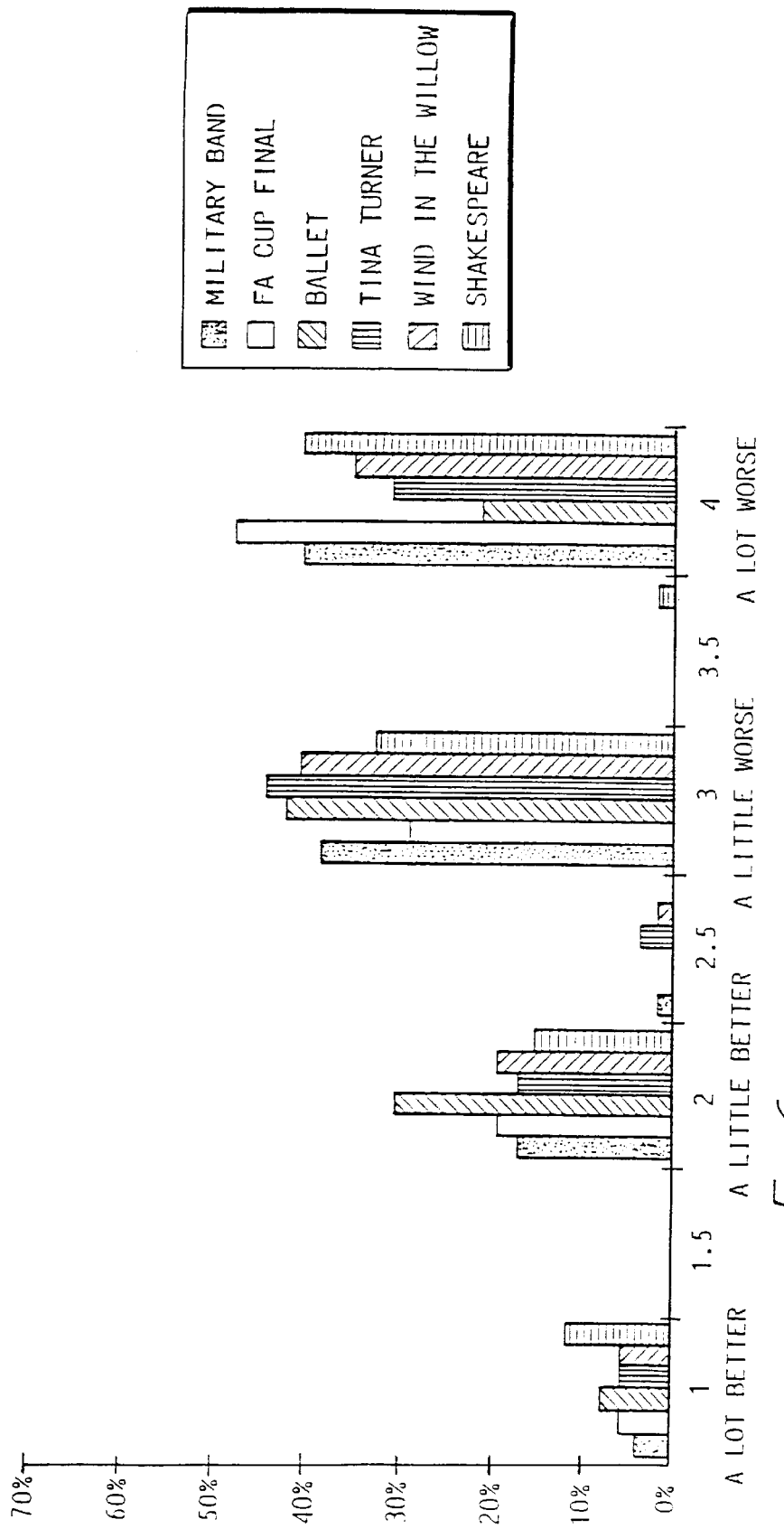
FIG. 6 is a histogram illustrating the results of subjective tests carried out using 16:9 letterbox presentation.

The results obtained from a comparison of these two versions for individual sequences are shown in the form of histograms in FIGS. 5 and 6. The mean values of the grades shown in FIGS. 5 and 6 are shown in FIG. 7.

Figure 7:
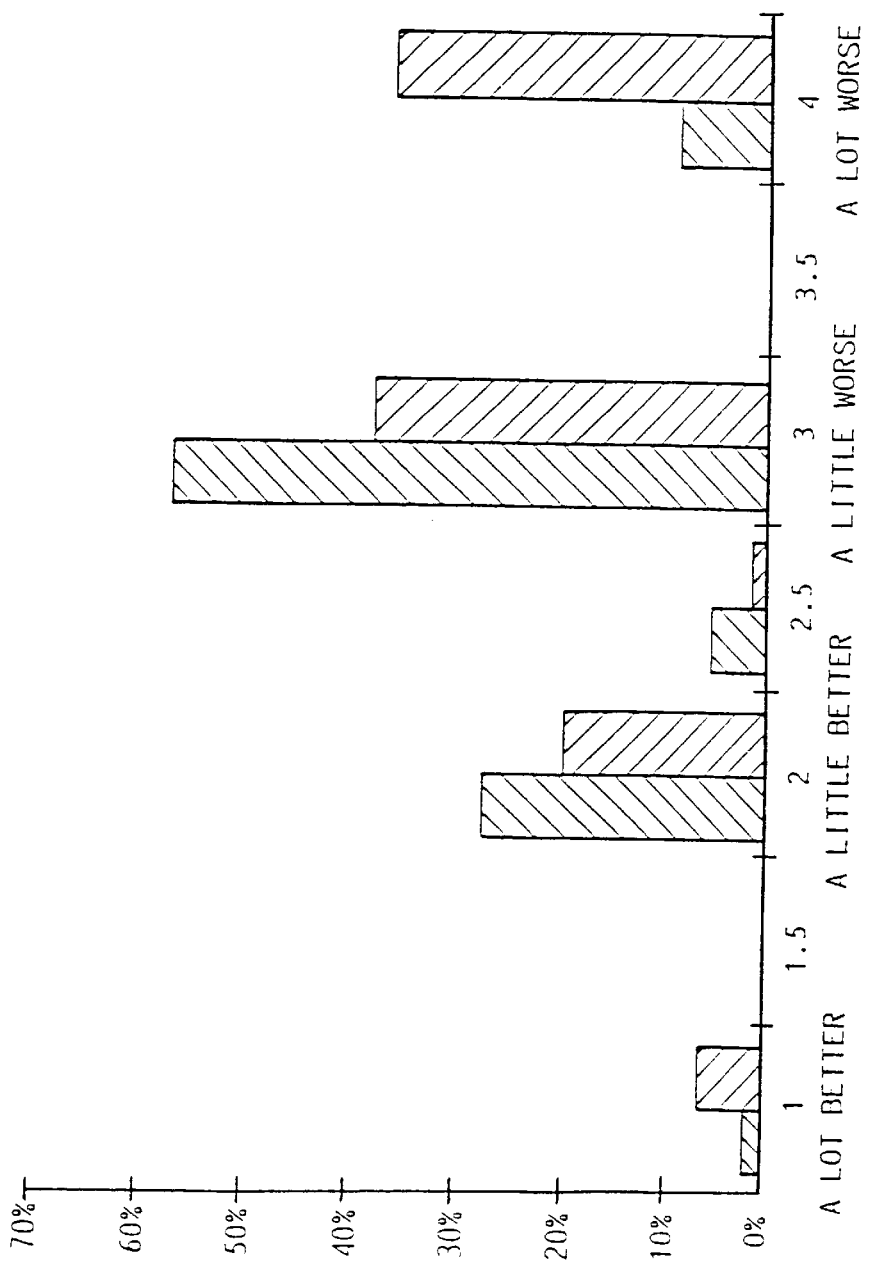
FIG. 7 shows the mean values of the results illustrated in FIGS. 5 and 6.
Figure 8:
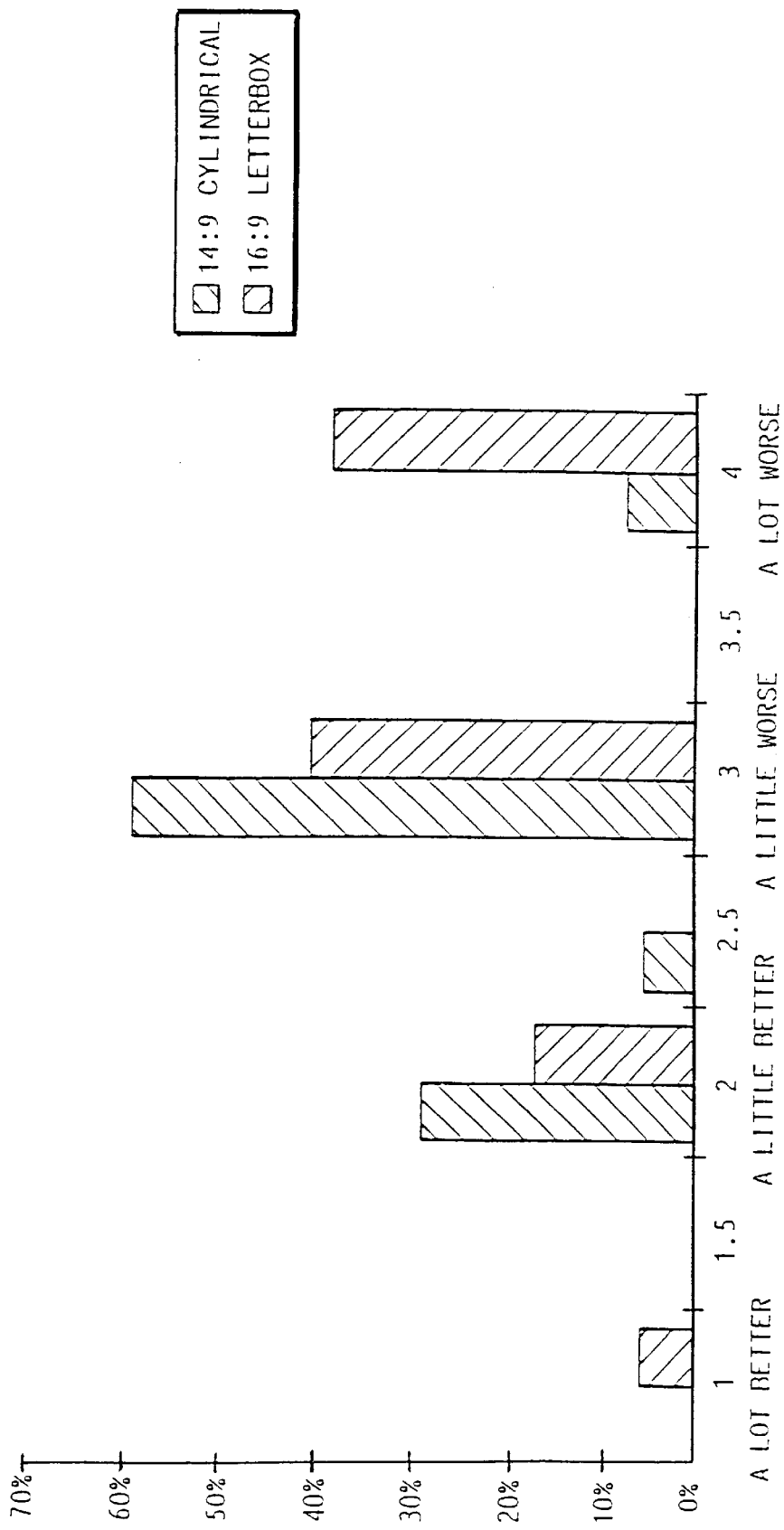
FIG. 8 shows an overall assessment similar to FIG. 7 but after separate comparisons on individual sequences.

FIG. 8 is similar to FIG. 7 but shows the overall assessment after separate comparisons on individual sequences. It can be seen that both methods of obtaining means grades for all six sequences gave very similar results.

The results given in FIGS. 5, 6, 7 and 8 indicate that in general the 14:9 stretched cylinder pictures were comparable to normal 4:3 pictures, 90% of grades being in the range 2 (a little better) to 3 (a little worse).

In contrast, opinions about the 16:9 full letterbox format were more widely spread over the whole of the grading scale with a significant proportion (37%) grading it a lot worse than the usual format; on the other hand, 6% (as opposed to 2% for 14:9) graded it a lot better. In addition, the number of people answering "yes" or "possibly" to the question asking if the change of format would not affect their viewing habits was about 60% compared to about 24% for the 14:9 format.

These results indicate that the use of the 16:9 format is more likely to reduce the number of viewers for broadcast programmes than would the use of the 14:9 format.

The order of presentation of full letterbox and stretched cylinder formats as used on the two different VHS tapes used in the subjective tests did not have any significant effect on the results obtained.

Figure 9:
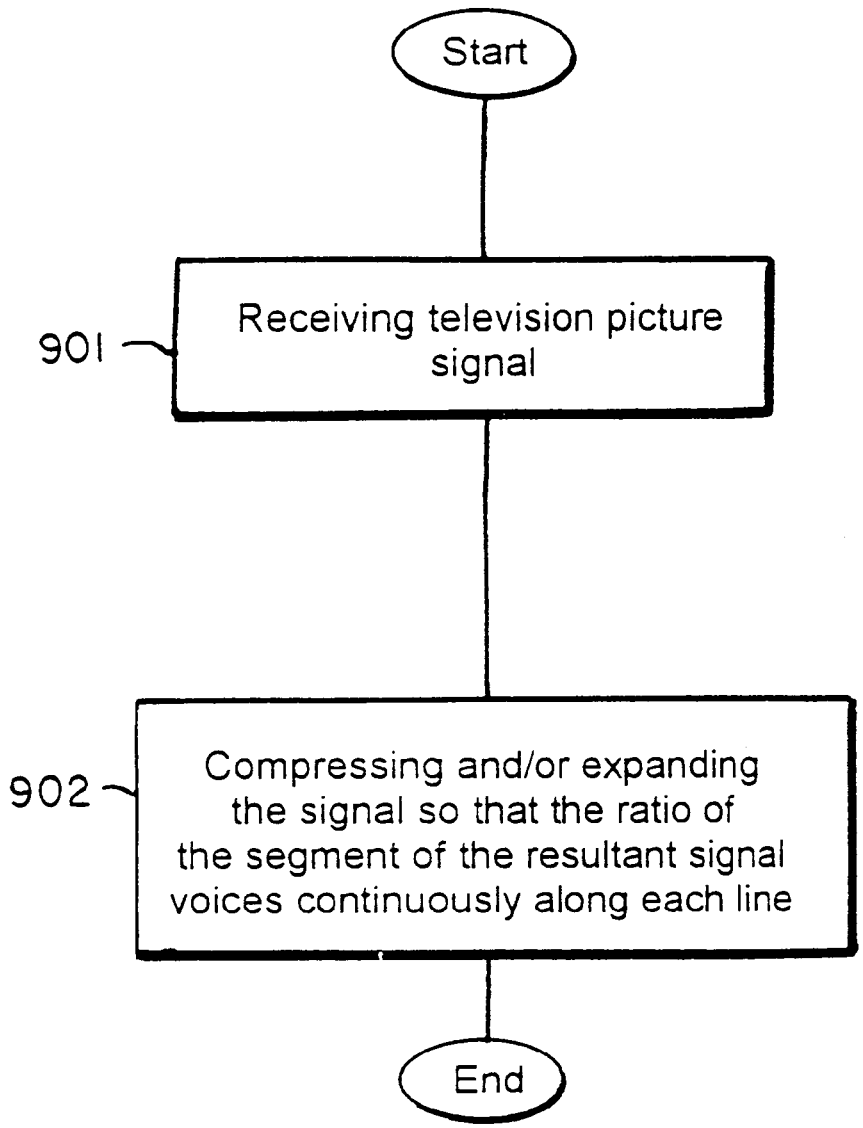
FIG. 9 is a flowchart showing the methods of the invention.

As shown in the flowchart of FIG. 9, the television picture signal is received at step 901 and compressed and/or expanded at step 902, as discussed above.

Conclusions

Initial tests have indicated that the use of "stretched cylindrical" processing to squeeze 16:9 pictures into a 14:9 format provides a more acceptable means of showing "16:9" pictures on a 4:3 display than a 16:9 undistorted full letterbox format.

The advantage of the cylindrical format is that it reduces the height of the black borders at the top and bottom of the 4:3 picture area compared to those given by a full letterbox format, whilst not distorting the middle of the picture. The disadvantage is that it introduces geometrical distortion in the form of a horizontal compression squeezes the edges of the edges of the picture. However, the amount of reduction in black borders which can be achieved without excessive geometrical distortion is not quite adequate and a further reduction by means of a vertical picture stretch is beneficial.

Cylindrical processing has the additional advantage that it gives more resolution at the centre, but less at the edges, of a regenerated 16:9 display compared to that given by a full letterbox format.

We claim:

1. A method of processing a television picture signal, the television signal when unprocessed having a plurality of lines which, when displayed sequentially, form an undistorted image, the method comprising the steps of:

taking the unprocessed television picture signal; and
   compressing or expanding said unprocessed television signal so that the ratio of the dimension of each segment of the unprocessed signal to the dimension of the segment of the resultant signal derived from it varies continuously along each line, whereby the lines of the resultant signal, when displayed sequentially, form a distorted image,
   the signal portion representing each line being compressed or expanded more adjacent the ends of each line than it is in the middle of the line and picture height being adjusted using a vertical interpolator.

2. A method according to claim 1 in which, in said compressing and/or expanding step, the signal representing each line is compressed as though the line were disposed along an arc of a circle and projected onto the chord joining the ends of that arc along a direction perpendicular to that notional chord, the overall compression ratio of the line being given by (sin α) /α where 2α is tie angle in radians subtended by the notional chord at the center of a notional circle of which said arc is a part.

3. A method of processing a television picture signal, the television signal when unprocessed having a plurality of lines which, when displayed sequentially, form an undistorted image having a first aspect ratio, the method comprising the steps of:

taking the unprocessed television picture signal; and
   compressing or expanding said unprocessed television signal so that the ratio of the dimension of each segment of the unprocessed signal to the dimension of the segment of the resultant signal derived from it varies continuously along each line, whereby the lines of the resultant signal, when displayed sequentially, form a distorted image having a second aspect ratio;
   the first aspect ratio being 16:9 and the second aspect ratio at which the signal is to be displayed being 4:3.

4. A method of processing a television picture signal, the television signal when unprocessed having a plurality of lines which, when displayed sequentially, form an undistorted image-having a first aspect ratio, the method comprising the steps of:

taking the unprocessed television picture signal; and
   compressing or expanding said unprocessed television picture signal so that the ratio of the dimension of each segment of the unprocessed signal to the dimension of the segment of the resultant signal derived from it various continuously along each line, whereby the lines of the resultant signal, when displayed sequentially, form a distorted image having a second aspect ratio.

5. A method according to claim 3 or claim 4 wherein the step of compressing or expanding said unprocessed television picture signal is performed by digital editing.

6. A method according to claim 4 in which the signal is further modified to change the number of lines which when displayed sequentially form the image.

7. A method according to claim 6 in which the number of lines is increased by interpolation or repetition.

8. A method of processing a television picture signal, the television signal when unprocessed having a plurality of lines which, when displayed sequentially, form an undistorted image having a first aspect ratio, the method comprising the steps of:

taking the unprocessed television picture signal; and
   compressing or expanding said unprocessed television signal so that the ratio of the dimension of each segment of the resultant signal derived from it various continuously along each line, whereby the lines of the resultant signal, when displayed sequentially, form a distorted image having a second aspect ratio;
   the first aspect ratio being 4:3 and the second aspect ratio at which the signal is to be displayed being 16:9.

9. A method of processing a television picture signal, the television signal when unprocessed having a plurality of lines which, when displayed sequentially, form an undistorted image having a first aspect ratio, the method comprising the steps of:

taking the unprocessed television picture signal; and compressing or expanding said unprocessed television signal so that the ratio of the dimension of each segment of the unprocessed signal to the dimension of the segment of the resultant signal derived from it varies continuously along each line, wherein the lines of the resultant signal, when displayed sequentially, form a distorted image having a second aspect ratio;

the first aspect ratio being 4:3 and the second aspect ratio at which the signal is to be displayed being 16:9; and further adjusting the picture height by using a vertical interpolator to change the number of lines in the resultant signal.

10. A method of processing a television picture signal, the television signal when unprocessed having a plurality of lines which, when displayed sequentially, form an undistorted image having a first aspect ratio, the method comprising the steps of:

taking the unprocessed television picture signal; and compressing said unprocessed television signal, said unprocessed signal being compressed as though each line signal were disposed along an arc of a circle and projected onto the chord joining the ends of that arc along a direction perpendicular to that notional chord, the overall compression ratio of the line being given by $\sin(\alpha)/\alpha$ where $2\alpha$ is the angle in radians subtended by the notional chord at the center of a notional circle of which the arc is a part, so that the ratio of the dimension of each segment of the resultant signal derived from it various continuously along each line;

whereby the lines of the resultant signal, when displayed sequentially, form a distorted image having a second aspect ratio.

11. A method of processing a television picture signal, the television signal when unprocessed having a plurality of lines which, when displayed sequentially, form an undistorted image having a first aspect ratio, the method comprising the steps of:

taking the unprocessed television picture signal;

compressing said unprocessed television signal, said unprocessed signal being compressed as though each line signal were disposed along an arc of a circle and projected onto the chord joining the ends of that arc along a direction perpendicular to that notional chord, the overall compression ratio of the line being given by $\sin(\alpha)/\alpha$ where $2\alpha$ is the angle in radians subtended by the notional chord at the center of a notional circle of which the arc is a part, so that the ratio of the dimension of each segment of the resultant signal derived from it various continuously along each line;

whereby the lines of the resultant signal, when displayed sequentially, form a distorted image having a second aspect ratio; and further adjusting the picture height by using a vertical interpolator to change the number of lines in the resultant signal.

12. A method of processing a television picture signal, the television signal when unprocessed having a plurality of lines which, when displayed sequentially on a substantially flat, planar display, form an undistorted image having a first aspect ratio, the method comprising the steps of:

taking the unprocessed television picture signal; and compressing or expanding said unprocessed television signal so that the ratio of the dimension of each segment of the unprocessed signal to the dimension of the segment of the resultant signal derived from it varies continuously along each line, whereby the lines of the resultant signal, when displayed sequentially on a substantially flat, planar display, form a distorted image having a second aspect ratio.

13. A method of processing a television picture signal, the television signal when unprocessed having a plurality of lines which, when displayed sequentially, form an undistorted image having a first aspect ratio, the method comprising the steps of:

taking the unprocessed television picture signal; and compressing or expanding said unprocessed television signal so that the ratio of the dimension of each segment of the unprocessed signal to the dimension of the segment of the resultant signal derived from it varies continuously along each line, wherein the lines of the resultant signal, when displayed sequentially, form a distorted image having a second aspect ratio; and further adjusting the picture height by using a vertical interpolator to change the number of lines in the resultant signal.

* * * * *